Oct. 25, 1949.  O. L. TAYLOR  2,486,343
CIRCUIT CONTROL APPARATUS
Filed Nov. 29, 1947  2 Sheets-Sheet 1
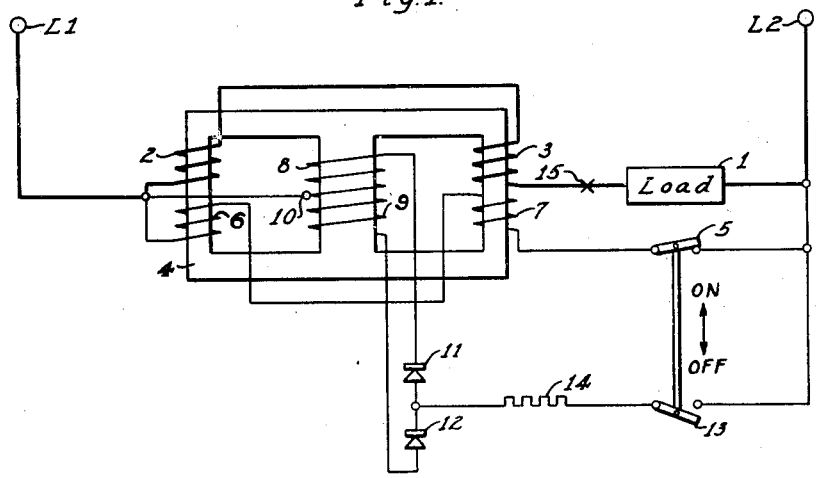
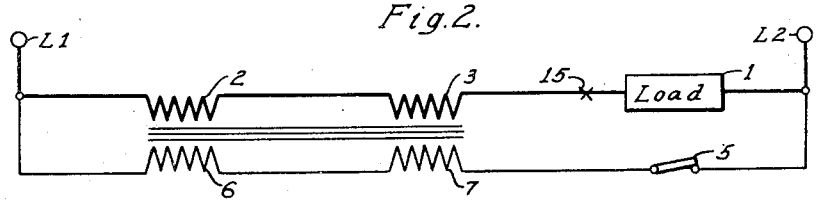
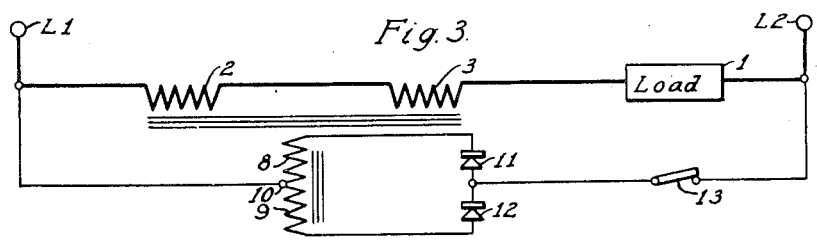
WITNESSES:
INVENTOR
Owen L. Taylor.
BY
ATTORNEY Oct. 25, 1949.    O. L. TAYLOR    2,486,343
CIRCUIT CONTROL APPARATUS
Filed Nov. 29, 1947    2 Sheets-Sheet 2

WITNESSES:

INVENTOR
Owen L. Taylor.
BY
ATTORNEY

Patented Oct. 25, 1949

2,486,343

UNITED STATES PATENT OFFICE 2,486,343

CIRCUIT CONTROL APPARATUS

Owen L. Taylor, Wilkinsburg, Pa., assignor to Westinghouse Electric Corporation, East Pittsburgh, Pa., a corporation of Pennsylvania Application November 29, 1947, Serial No. 788,813

10 Claims. (Cl. 323—9)

My invention relates to alternating-current control apparatus comparable as to general purpose to circuit breakers, contactors and the like switches.

It is an object of my invention to provide control apparatus capable of controlling the current in alternating circuits with a circuit "opening" or "closing" performance of a circuit breaker yet without mechanical interruption of the controlled load circuit and hence without requiring the arc rupturing means of conventional circuit breakers.

Another object of my invention is to devise a circuit control apparatus which obviates moving parts in the controlled load circuit and can be manufactured with a minimum of tooled parts and mechanisms.

It is also an object of my invention to provide a circuit control device, for the switching of small loads on comparatively heavy systems, which affords better protection than conventional circuit breakers from damage to the load due to the extreme short circuit currents possible in such systems.

In order to achieve these objects and in accordance with a feature of my invention, I provide a saturable magnet core with two A.-C. coils and a saturating D.-C. coil and connect one of the A.-C. coils in the load circuit, the other A.-C. coil in a control circuit connected in parallel to the load circuit, and the D.-C. coil in another control circuit; and I also provide circuit control means, such as contacts, in the two respective control circuits and interconnect these control means so that the coil of only one control circuit is energized at a time. The coil in the A.-C. control circuit, when energized, induces in the load circuit coil a voltage substantially equal and in opposition to the load voltage so that the latter voltage is neutralized and the load current "interrupted" without opening the load circuit. The D.-C. coil, when energized, reduces or substantially eliminates the inductive impedance of the load circuit coil so that then the load current is permitted to flow. The control means or contacts are effective only in the control circuits and hence are of low current capacity.

My invention, as just outlined, can be realized by various circuit schemes; in particular the saturable core or cores may be given different shapes, and the coil circuits may also be designed and connected in different ways. According to a preferred feature of my invention, however, the direct-current circuit is designed with two parallel-connected branches both connected across the load circuit and each containing a saturating coil and a rectifier. The two saturating coils are arranged for cumulative action and energized in alternate half wave periods respectively of the energizing A.-C. voltage. According to another specific feature of my invention, I arrange the saturating coils on the center leg of a three-legged saturable magnet core and divided each of the two other coils into two parts disposed on the two outer legs respectively.

These and other objects and features of the invention will be apparent from the drawing, in which:

Figure 1 shows the circuit diagram of a control apparatus according to the invention;

Fig. 2 shows a portion of the same circuit diagram in straight line fashion for explaining the conditions existing when a load circuit is "switched off";

Fig. 3 shows also a portion of the same circuit diagram in straight line fashion for explaining the conditions existing when the load circuit is "switched on"

Figure 4:
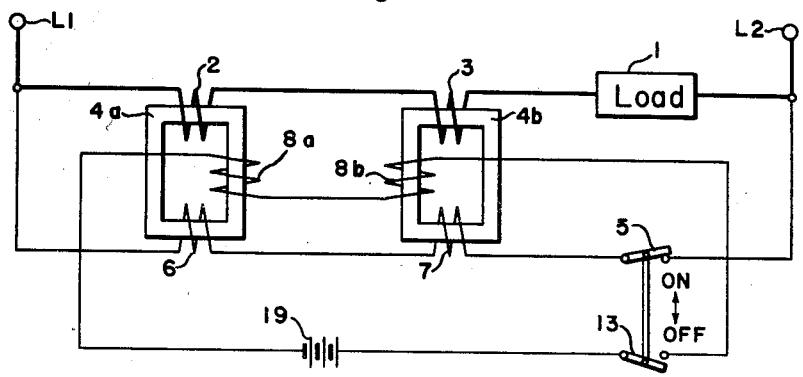
Figs. 4 and 5 show two modifications respectively of control apparatus according to the invention.

In Fig. 1 the terminals of the apparatus are denoted by L1 and L2, respectively. Connected across these terminals is a load circuit that includes the load device 1 and two coils or coil portions 2 and 3 in series connection. The two coils 2 and 3 are disposed on the respective outer legs of a three-legged magnet core 4 which may consist of a stack of laminations as customary in transformers and reactors. The center leg of core 4 has preferably at least twice the cross section of the outer legs unless the center leg is composed of a more highly permeable material.

Connected across the load circuit, i. e., between the terminals L1 and L2 is a first control circuit which includes in series connection a contact 5 and two coils or coil portions 6 and 7. Coils 6 and 7 are disposed on the same core legs as the coils 2 and 3, respectively. Coils 2 and 3 have preferably the same number of turns. Coils 6 and 7 have preferably also the same number of turns. The turn numbers of all four coils may be equal.

Disposed on the center leg of core 4 are two series-connected coils 8 and 9 which may consist of a mid-tapped single winding. The midpoint 10 is connected to terminal L1 while the terminals of coils 8 and 9 are attached to series-connected rectifiers 11 and 12, respectively, whose common terminal is connected through a contact 13, and if necessary, through a resistor 14 to the terminal L2. The two contacts 5 and 13 are interconnected so that only one contact is closed at a time depending upon the selected position of the contact assembly.

When the contacts are in the position shown in Fig. 1, the saturating coils 8 and 9 are deenergized and ineffective. The circuits then active are separately shown in Fig. 2. The control coils 6 and 7 are now energized. They induce in coils 2 and 3 two component voltages, which oppose the voltage drop in coils 2 and 3 due to the voltage across the load circuit. By properly dimensioning the turn ratio of coils 6 and 2, and 7 and 3 the induced opposing voltage can be made equal or substantially equal to the load circuit voltage. For instance, if the voltage across terminals L1 and L2 is 220 volts and all four coils have the same number of turns and the same resistance, the coil 6 induces in coil 2 a voltage of 110 volts and the coil 7 induces in coil 3 a voltage of 110 volts so that the total secondary voltage across series-connected coils 2 and 3 is 220 volts and equal to the voltage drop across terminals L1 and L2. Under these conditions, the point of the load circuit denoted by 15 has the same potential as the terminal L2, the voltage drop across the load device 1 is zero, and there is no current flow through the load circuit.

If the contacts are shifted so that contact 5 opens and contact 13 closes, the control coils 6 and 7 are disconnected and hence ineffective. The active circuits then existing are illustrated in Fig. 3. The two saturating coils 8 and 9 are now energized by rectified current during alternating half wave periods, respectively, of the alternating voltage. As a result, the center leg of core 4 is continuously energized by direct current and the core 4 becomes saturated. As a result, the inductive impedance of coils 2 and 3 is reduced to a minimum so that current is permitted to flow through the load circuit.

It will be recognized that apparatus as described above permit a load circuit to be switched on and off without interrupting the circuit connection and hence without requiring the occurrence and extinction of an arc. The contacts 5 and 13 are disposed in control circuits which carry magnetizing current only. Consequently, these contacts require a much smaller current capacity than would be necessary for an interrupter contact directly disposed in the load circuit. For the same reason, the contacts 5 and 13 may readily be replaced by circuit control devices of different kinds, for instance, by thyratrons or other relay devices. Hence, the apparatus is also well suitable for remote control purposes.

While the invention can be used in circuits and for loads of any rating, a particular advantage arises when applying the invention to the control of relatively small loads that are energized from high power lines and hence exposed to the danger of being damaged by the extremely heavy short-circuit currents possible under such operating conditions. Control apparatus according to the invention reduce this danger considerably by virtue of the high impedance that the saturable device offers to short-circuit currents.

It will be recognized by those skilled in the art that control apparatus according to the invention may be modified in different respects without obviating the objects and advantages. For instance, the direct current circuit of the saturating coils may be energized from a separate source of direct current, only one coil may be employed instead of the coil pairs illustrated, or the saturable device may be composed of two or several coils instead of using a single three-legged structure. While the illustrated embodiment involves single phase control, the invention is readily applicable to multi-phase circuits and it should be noted that then only one saturating D.-C. circuit is necessary for the saturable cores for all phases of the system.

Figure 5:
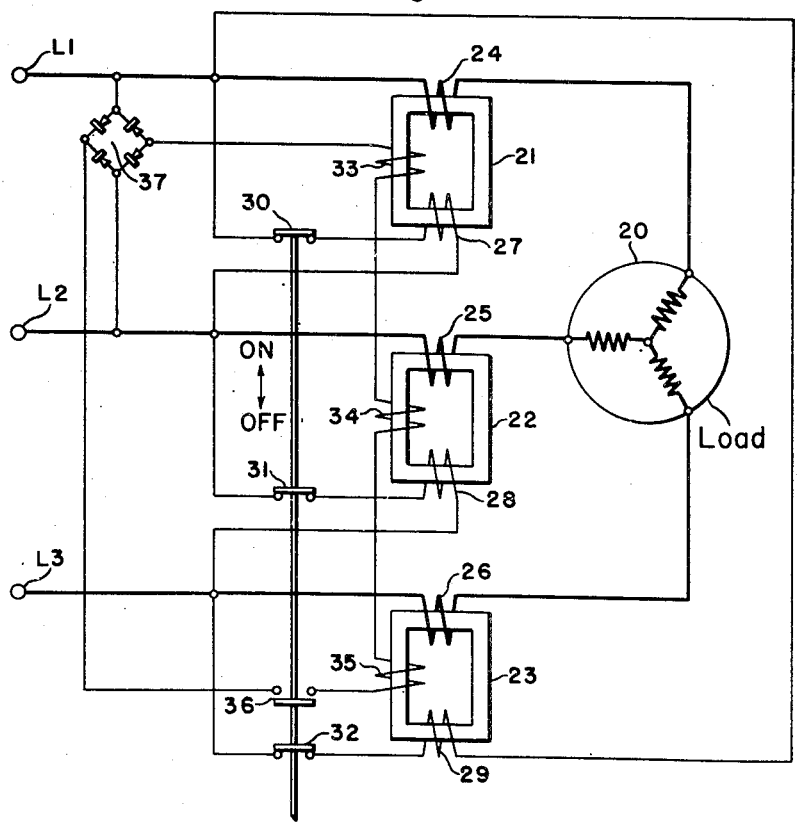

Modifications of the just-mentioned designs are illustrated in Figs. 4 and 5. A modification according to Fig. 4 is largely similar to that of Fig. 1. The load 1 is energized from alternating-current terminals L1 and L2 through the reactance coils 2 and 3 of two saturable reactors whose cores are denoted by 4a and 4b, respectively. Connected across terminals L1 and L2 is a control circuit which extends through the contact 5 of a switch and includes coils 6 and 7 which are inductively associated with the respective reactor cores 4a and 4b. Cores 6 and 7 are rated and poled so that when contact 5 is closed, two respective voltages are induced in coils 2 and 3 which substantially cancel the voltage drop in coils 2 and 3 caused by the alternating terminal voltage. Consequently, with contact 5 closed, no current will flow through the load. Each reactor is further equipped with a saturating coil 8a and 8b, respectively. The coils are connected to a suitable source of direct-current schematically shown at 19 under control by another contact 13 of the above-mentioned switch. Contact 13 is open when contact 5 is closed and is closed when contact 5 is open. With contact 13 closed, the coils 6 and 7 are denergized and the coils 8a and 8b are excited by direct current so as to saturate the reactors and reduce the reactance of coils 2 and 3 to a minimum. Consequently, the load 1 is now switched into the circuit and transversed to the rated load current.

The modification shown in Fig. 3 represents a three phase arrangement. The load 20 is energized from alternating-current terminals L1, L2 and L3. The apparatus is equipped with three saturable reactors whose cores are denoted by 21, 22 and 23, respectively. Each phase of the load circuit includes the reactance coil 24, 25 or 26 of one of the respective reactors. Each reactor has a second coil 27, 28 or 29 which is connected across one of the respective phase circuits under control by a contact 30, 31 or 32 of a control switch. When these contacts are closed, the coils 27, 28 and 29 induce in the respective coils 24, 25 and 26 a voltage in opposition to the load voltage drop of the latter coils so that substantially no current will flow through the load. Each reactor core is equipped with a saturating coil 33, 34 or 35. The coils 33, 34 and 35 are series connected through a contact 36 of the above-mentioned switch across a source of direct current here shown as a full-wave rectifier 37 whose input circuit extends across terminals L1 and L2. When the switch is moved to open its contacts 30, 31 and 32, the contact 36 closes and applies saturating excitation to the direct-current coils. Then the coils 27, 28 and 29 are deenergized and the reactance of the reactors is reduced to a minimum so that the load receives rated current.

I claim as my invention:

1. Alternating-current control apparatus, comprising terminals to provide A.-C. voltage, a load circuit connected across said terminals and having first coil means, a control circuit connected across said terminals and having second coil means and circuit control means for controlling the energization of said second coil means, a saturable core inductively associated with said first and second coil means, said second coil means being poled so that said second coil means when energized induces voltage in said first coil means in opposition to said A.-C. voltage, and another control circuit connected across said terminals and having a saturating coil and direct-current supply means and another circuit control means for controlling the direct-current energization of said saturating coil, said saturating coil being inductively associated with said core for saturating said core, and said two control means being associated with each other so that only one of said second coil and said saturating coil is energized at a time.

2. Alternating-current control apparatus, comprising terminals to provide A.-C. voltage, a load circuit connected across said terminals and having first coil means, a control circuit connected across said terminals and having second coil means and a contact for controlling said second coil means, a saturable core inductively associated with said first and second coil means, said second coil means being poled so that said second coil means when energized induces voltage means in said first coil means in opposition to said A.-C. voltage, and another control circuit connected across said terminals and having a saturating coil and direct-current supply means and another contact for controlling the direct-current energization of said saturating coil, said saturating coil being inductively associated with said core for saturating said core, and said two contacts being interconnected and movable together between two positions so that only one of said second coil and said saturating coil is energized at a time depending upon the contact position.

3. Alternating-current control apparatus, comprising terminals to provide A.-C. voltage, a load circuit connected across said terminals and having two series-connected first coils, a control circuit having two second coils and circuit control means for controlling the energization of said second coils, saturable magnetic core means inductively associated with said first and second coils, said second coils being poled to induce in said respective first coils voltages in opposition to said A.-C. voltage, and another control circuit connected across said terminals and having saturating coil means inductively associated with said core means and rectifier means for energizing said saturating coil to unidirectionally magnetize said core means, said other control circuit having another circuit control means for controlling the energization of said saturating coil means, said two control means being associated with each other so that said second coils are deenergized when said saturating coil means are energized and said saturating coil means are denergized when said second coils are energized.

4. Alternating-current control apparatus, comprising terminals to provide A.-C. voltage, a load circuit connected across said terminals and having two series-connected first coils, a control circuit having two second coils and a contact series-connected with one another across said terminals, saturable magnetic core means inductively associated with said first and second coils, said second coils being poled so that, when said contact is closed, said second coils induce voltages in said respective first coils in opposition to voltage drop in said first coils resulting from the terminal voltage, and another control circuit connected across said terminals and having another contact and having saturating coil means and rectifying means connected with said coil means for energizing said coil means by rectified current when said other contact is closed, said coil means being inductively associated with said core means for saturating said core means, and said contacts being associated with each other so that either contact is closed when the other is open.

5. Alternating-current control apparatus, comprising terminals to provide A.-C. voltage, a load circuit connected across said terminals and having two series-connected first coils, a control circuit having two second coils and a contact series-connected with one another across said terminals, saturable magnetic core means inductively associated with said first and second coils, said second coils being poled so that, when said contact is closed, said second coils induce voltages in said respective first coils in opposition to voltage drop in said first coils resulting from the terminal voltage, and another control circuit connected across said terminals and having another contact and two parallel branches each containing a saturating coil and a rectifier in series-connection with each other so that the saturating coils are energized by rectified current when said second contact is closed, said saturating coils being inductively associated with said core means for cumulatively saturating the core means, and said contacts being associated with each other so that either contact is closed when the other is open.

6. In control apparatus according to claim 1, said first coil means and said second coil means having substantially the same number of turns so that the induced voltage of said first coil means is substantially equal to said A.-C voltage.

7. Alternating-current control apparatus, comprising terminals to provide A.-C. voltage, a load circuit connected across said terminals and having a first coil, a control circuit connected across said terminals and having a second coil and circuit control means for controlling the energization of said second coil, a saturable core inductively associated with said first and second coils, and said second coil being poled so that said second coil when energized induces voltage in said first coil in opposition to said A.-C. voltage, and another control circuit connected across said terminals and having two parallel branches each including a saturating coil and a rectifier pole for energizing said saturating coils during alternate half wave periods, respectively, of said A.-C. voltage, said second control circuit having another circuit control means for controlling the energization of said saturating coils, said saturating coils being inductively associated with said core in cumulative relation to each other for continuously saturating said core, and said two control means being associated with each other for mutually exclusive energization, respectively, of said second coil and said saturating coils.

8. Alternating-current control apparatus, comprising a three-legged saturable magnet core, a load circuit having two series-connected first coils disposed on the outer legs respectively of said core, a control circuit connected across said load circuit and having two series-connected second coils also disposed on said respective outer legs for inducing when energized a voltage in said first coils substantially equal and opposed to the voltage of said load circuit, a circuit control means disposed on said control circuit for controlling the energization of said second coils, another control circuit connected across said load circuit and having two parallel branches each including a saturating coil and a rectifier poled for energizing said saturating coils during alternate half wave periods respectively of the load circuit voltage, said second control circuit having another circuit control means for controlling the energization of said saturating coils, said saturating coils being disposed on the center leg of said core in cumulative relation to each other for continuously saturating said core, and said two control means being associated with each other for mutually exclusive energization respectively of said second coil and said saturating coils.

9. Alternating-current control apparatus, comprising a saturable magnet core, an A.-C. load circuit having a first coil disposed on said core, a control circuit connected across said load circuit and having a second coil disposed on said core said second core being poled and rated for inducing when energized a voltage in said first coil substantially equal and in opposition to that of said load circuit, said control circuit having circuit control means for controlling the energization of said second coil, and a direct-current circuit having a saturating coil disposed on said core for saturating said core and having circuit control means for controlling the energization of said saturating coil, said two control means being associated with each other for mutually exclusive energization respectively of said second coil and said saturating coil.

10. Alternating - current control apparatus, comprising a three-legged saturable magnet core, an A.-C. load circuit having two first coils disposed respectively on the outer legs of said core, a control circuit connected across said load circuit and having two second coils disposed on said respective outer legs for inducing when energized a voltage in said first coils substantially equal and opposed to the voltage of said load circuit, a circuit control means disposed in said control circuit for controlling the energization of said second coils, and a direct-current circuit having a coil disposed on the center leg of said core for saturating said core, said direct-current circuit having circuit control means disposed for controlling the energization of said latter coil and associated with said other circuit control means so that said second coils are deenergized when said saturating coil is energized and vice versa.

OWEN L. TAYLOR.

REFERENCES CITED

The following references are of record in the file of this patent:

UNITED STATES PATENTS

| Number | Name | Date |
|---|---|---|
| 2,126,790 | Logan | Aug. 16, 1938 |
| 2,210,805 | Edwards | Aug. 6, 1940 |
| 2,409,610 | Bixby | Oct. 22, 1946 |